(No Model.) 2 Sheets—Sheet 2.
L. E. VAN ANTWERP & M. L. NORTON.
AUTOMATIC VEHICLE BRAKE.
No. 387,022. Patented July 31, 1888.
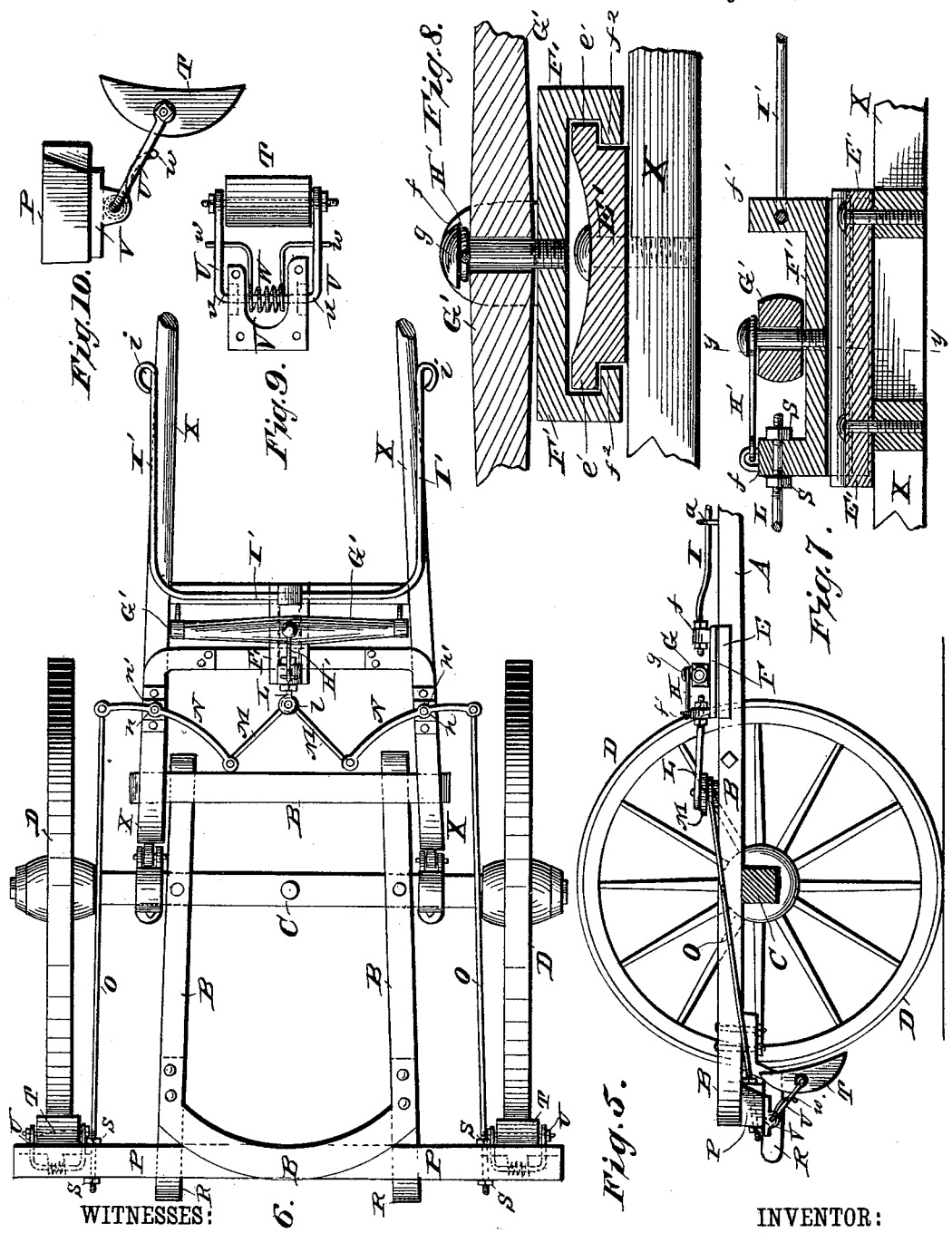
WITNESSES:
Phil C. Dietrich.
C. Sedgwick.
INVENTOR:
L. E. Van Antwerp.
M. L. Norton.
BY Munn & Co.
ATTORNEYS.

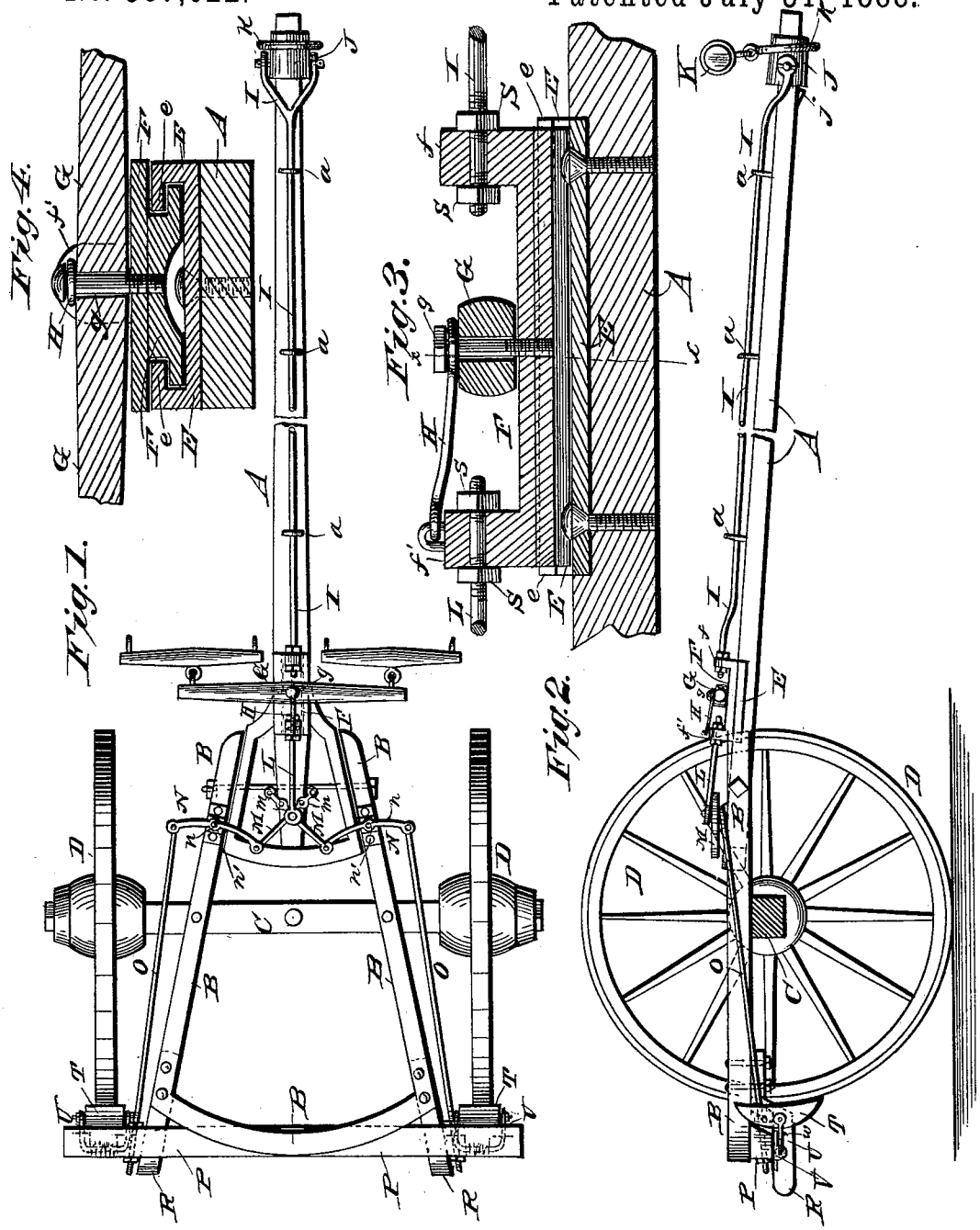

UNITED STATES PATENT OFFICE.

LINFORD E. VAN ANTWERP AND MORGAN L. NORTON, OF SUSQUEHANNA PENNSYLVANIA.

AUTOMATIC VEHICLE-BRAKE.

SPECIFICATION forming part of Letters Patent No. 387,022, dated July 31, 1888.

Application filed October 11, 1887. Serial No. 251,988. (No model.)

*To all whom it may concern:*

Be it known that we, LINFORD E. VAN ANTWERP and MORGAN L. NORTON, of Susquehanna, in the county of Susquehanna and State of Pennsylvania, have invented a new and Improved Automatic Vehicle-Brake, of which the following is a full, clear, and exact description.

Our invention relates to a brake for vehicles which will operate automatically to slacken the speed of a forwardly-running vehicle or to stop it, and which will allow free backing of the vehicle.

The invention is adapted for use with running gear having either pole or shafts, and is simple, inexpensive, and effective for its intended purposes.

The invention consists in certain novel features of construction and combinations of parts of the vehicle-brake, all as hereinafter described and claimed.

Reference is to be had to the accompanying drawings, forming a part of this specification, in which similar letters of reference indicate corresponding parts in all the figures.

Figure 1 is a plan view of the forward running-gear with a pole and to which our improvements are applied. Fig. 2 is a side elevation thereof with the axle in section and with the brake applied. Fig. 3 is an enlarged detail longitudinal section taken through the pole, the doubletree, and adjacent parts of the brake mechanism. Fig. 4 is a transverse section taken on the line $x\ x$, Fig. 3. Fig. 5 is a side view of the pole running-gear with the pole broken away and the brake released. Fig. 6 is a plan view illustrating our improvement as applied to a wagon-gear provided with thills and a whiffletree. Fig. 7 is an enlarged detail longitudinal section taken through the whiffletree and adjacent parts of the brake mechanism shown in Fig. 6. Fig. 8 is a vertical transverse section taken on the line $y\ y$, Fig. 7. Fig. 9 is a plan view of one of the brake-shoes and fastening-plate and spring connection, and Fig. 10 is a detail side view of one of the brake-shoes and adjacent parts.

We will more particularly describe the invention with reference to the pole wagon-gear and as shown in Figs. 1 to 5, inclusive, of the drawings, and as follows:

The pole A is connected in the usual or any approved way to the hounds B, which are fixed to the axle C, on which the wheels D D are placed. To the pole A near its back end is fixed a plate, E, in which a plate, F, is fitted to slide lengthwise of the pole, and to the plate F the doubletree G is held pivotally by a bolt or pin, $g$, which is stayed to a rear lug, $f'$, of the plate F by a hammer-strap or tie-bar, H.

A metal bar or rod, I, which is held to the front lug, $f$, of the plate F, extends forward along the pole A and through suitable guide eyes or staples, $a$, on the pole, and at its forward end is connected to a sleeve or sliding collar, J, which is fitted on the pole, and which will be engaged by a ring, $k$, of the neck-yoke K of the harness, which, when drawn backward, will slide the sleeve J against a lug, $j$, fixed to the pole to back the vehicle and will at the same time push the rod I and plate F backward to apply the brake when the vehicle is moving forward and as hereinafter more fully explained.

A metal bar or rod, L, which is held to the rear lug, $f'$, of the plate F, extends rearward and is connected by a pivot, $l$, with a crossed pair of toggle bars or levers, M M, which at their rear ends are pivoted to the inner ends of levers N N, which are fulcrumed at $n\ n$ to the opposite side bars of the hounds B, and are connected at their outer ends by rods or bars O O with a transverse brake-beam, P, which is supported to slide forward and backward upon a couple of bars or arms, R R, which are bolted at their forward ends to the opposite side bars of the hounds. The levers M are each provided with a series of holes, $m$, at their forward ends to receive a pin, $l$, for connecting them at different adjustments with the rod L to accommodate wear of the parts or differently-proportioned running-gear. Metal plates $n'$, bolted to the hounds, receive the fulcrum-pivots $n$ of the levers N, and where the rods I L O connect with the lugs of the plate F and with the brake-beam P we prefer to use two locking-nuts, S S, on the rods, or one at each side of the plate lugs and beam, all as shown in the drawings.

The brake-shoes T are each connected to a metal stirrup, U, which, by its cross-bar $u$, is hung loosely in lugs on a plate, V, fixed to the under side of the brake-beam. A strong spring, W, which is supported on the stirrup-bar u, has bent end parts, w w, which range below the sides of the stirrup U and normally lift the brake-shoe to the adjacent wheel D, but allow the shoe to yield when the vehicle is backed, as presently explained.

The operation of the automatic brake is very simple and effective, and as follows: When the team hold back on the neck-yoke, its ring will draw the sleeve J, rod I, plate F, and rod L backward, and this will operate the levers M M and N N and pull forward on the rods O O and the brake-beam P to apply the brake-shoes T to the wheels D to stop the vehicle or slacken its speed, as required. When the vehicle is backed and the wheels D consequently turn backward, the brake beam will be moved forward, as when the vehicle and its wheels are moving forward; but in backing, and when the wheels turn backward, the springs W allow the brake-shoes to yield or turn downward with the adjacent wheel-tires and allow the wheels to slip under the brake-shoes; hence in backing the vehicle the brake will not be applied, as will readily be understood.

Figs. 6, 7, and 8 of the drawings represent a modification of our invention adapting it to a vehicle provided with shafts or thills X X, which are suitably coupled to the axle C of the wheels D, and have fixed to their cross-bars a plate, E', on which slides another plate, F', to the front lug, f', of which is connected the cross-piece of a ⊂ shaped metal rod or bar, I', the opposite sides of which range along the shafts X X and are provided at their forward ends with eyes or loops i, to which the breeching-strap of the harness of the horse in the shafts will be connected, and the draft-traces of the harness will be connected to the whiffletree G', which is pivoted on a pin, g, fixed to the movable plate F', said pin being stayed to the plate F' by a hammer strap or bar, H'. The parts G' H' I' are substantial equivalents of the parts G H I, described with the pole or two-horse vehicle aforesaid, and the connections L M N O P R T U V W are also the same in the thill-vehicle as with the pole-gear, and as clearly shown in the drawings.

It is obvious that a draft on the whiffletree G' will not apply the brake-shoes T to the wheels D, and that a back pull on the breeching-bar I' when the vehicle is moving forward will apply the brake, and that a back pull on the breeching-bar I', when the wheels are turning backward while backing the vehicle will not apply the brake, all as will be readily understood from the aforesaid description.

It will be noticed that the plates E E' and F F' are substantially alike, the plate E having overhanging lips or flanges e, which form grooves to receive tongues on the plate F, while the plate E' has overhanging tongues e', beneath which flanges $f^2$ on the plate F' move. Either construction of these sliding and guide plates may be used with either the pole or thill gearing, as may be preferred.

Having thus fully described our invention, we claim as new and desire to secure by Letters Patent—

1. The combination, in a vehicle-brake, with the running-gear, of the sliding brake-beam P, the stirrups U, pivotally connected with said beam, the brake-shoes T, supported by said stirrups, and the spring W, suitably supported and arranged to bear against and actuate the stirrups, all operating substantially as described, whereby the brake-shoes are forced against the wheels with a yielding pressure, as herein set forth.

2. The combination, in a vehicle-brake, of a plate, F, fitted to slide on the pole or shafts, a double or single tree or draft device held to the plate, a rod, I, connected to the plate and adapted to a backing device of the harness, a rod, L, also connected to the plate F, toggle-levers M, connected to the rod L, levers N, fulcrumed on the running-gear and connected to the levers M, a brake-beam, P, carrying shoes adapted to the wheels and fitted to slide on the running-gear, and rods O, connecting the beam P and levers N, substantially as described, for the purposes set forth.

3. In a vehicle-brake, the combination, with the running-gear, of a plate, F, fitted to slide on the pole, a doubletree or draft device held to the plate, a rod, I, connected to the plate, a sleeve, J, on the pole and to which the rod I is attached, a backing-lug, j, on the pole, a rod, L, connected to the plate F, toggle-levers M, connected to the rod L, levers N, fulcrumed on the running-gear and connected to the levers M, a brake-beam, P, brake shoes T, held to the beam by yielding stirrups U, and rods O, connecting the beam P and levers N, all arranged for operation substantially as herein set forth.

4. In a vehicle-brake, the combination, with rods I L, leading to the holdback and brake-applying devices, of a plate, E, on the pole or shafts, a plate, F, fitted to slide on the plate E and provided with lugs f f', to which the rods I L are connected, a draft tree held by a pin, g, to the plate F, and a hammer-strap or tie-bar, H, connecting the pin g with a lug of the plate F, substantially as shown and described.

LINFORD E. VAN ANTWERP.
MORGAN L. NORTON.

Witnesses:
BERT E. SMITH,
DAVID MASON.